(12) United States Patent
Teton-Landis (10) Patent No.: US 11,687,701 B1
(45) Date of Patent: Jun. 27, 2023

(54) SYSTEM, METHOD, AND COMPUTER PROGRAM FOR ENABLING TEXT EDITING ACROSS MULTIPLE CONTENT BLOCKS IN A SYSTEM

(71) Applicant: Notion Labs, Inc., San Francisco, CA (US)

(72) Inventor: Jacob Ian Teton-Landis, Santa Barbara, CA (US)

(73) Assignee: Notion Labs, Inc., San Francisco, CA (US)

( * ) Notice: Subject to any disclaimer, the term of this patent is extended or adjusted under 35 U.S.C. 154(b) by 0 days.

(21) Appl. No.: 17/581,776

(22) Filed: Jan. 21, 2022

(51) Int. Cl.
| | |
|---|---|
| *G06F 40/137* | (2020.01) |
| *G06F 40/183* | (2020.01) |
| *G06F 40/169* | (2020.01) |
| *G06F 40/14* | (2020.01) |
| *G06F 40/103* | (2020.01) |

(52) U.S. Cl.
CPC .......... *G06F 40/137* (2020.01); *G06F 40/14* (2020.01); *G06F 40/169* (2020.01); *G06F 40/183* (2020.01); *G06F 40/103* (2020.01)

(58) Field of Classification Search
CPC .... G06F 40/137; G06F 40/183; G06F 40/169; G06F 40/14
See application file for complete search history.

(56) References Cited

U.S. PATENT DOCUMENTS

| | | |
|---|---|---|
| 5,787,175 A | 7/1998 | Carter |
| 6,558,431 B1 * | 5/2003 | Lynch ................. G06F 16/958 715/236 |
| 8,434,134 B2 | 4/2013 | Khosrowshahi et al. |
| 9,076,128 B2 | 7/2015 | Horvitz et al. |
| 9,286,271 B2 | 3/2016 | Khosrowshahi et al. |
| 9,449,182 B1 | 9/2016 | Dang et al. |
| 10,164,783 B2 | 12/2018 | Alexander et al. |
| 10,171,255 B2 | 1/2019 | Alexander et al. |
| 10,257,196 B2 | 4/2019 | Dang et al. |
| 10,437,923 B2 | 10/2019 | Silk et al. |
| 10,466,867 B2 | 11/2019 | Boucher et al. |
| 10,466,868 B2 | 11/2019 | Boucher et al. |
| 10,567,382 B2 | 2/2020 | Dang et al. |
| 10,623,193 B2 | 4/2020 | Alexander et al. |
| 11,138,021 B1 | 10/2021 | Rosenstein et al. |

(Continued)

*Primary Examiner* — Scott T Baderman
*Assistant Examiner* — Seung Woon Jung
(74) *Attorney, Agent, or Firm* — Lessani Law Group, PC (57) ABSTRACT

The present disclosure describes a system, method, and computer program for enabling text editing across multiple content blocks in a system. The system renders a workspace page including a plurality of content blocks in a user interface of a client application. The workspace page is rendered according to a hierarchical tree derived from the parent and child attributes of the content blocks on the workspace page. The system maintains an in-memory selection state for text selection in the client application. The system receives a user selection of text on the workspace page across a plurality of content blocks. The system updates the in-memory selection state to include a text selection range. The system receives a user edit to the selected text. The system identifies the plurality of content blocks within the text selection range. The system applies the user edit to the content blocks within the text selection range.

21 Claims, 6 Drawing Sheets

(56) References Cited

U.S. PATENT DOCUMENTS

| | | |
|---|---|---|
| 11,153,328 B2 | 10/2021 | Bond |
| 11,423,357 B2 | 8/2022 | Didrickson et al. |
| 2003/0229607 A1* | 12/2003 | Zellweger ............. G06F 40/183 |
| 2011/0296507 A1 | 12/2011 | Khosrowshahi et al. |
| 2011/0314555 A1 | 12/2011 | Horvitz et al. |
| 2013/0246346 A1 | 9/2013 | Khosrowshahi et al. |
| 2015/0244538 A1 | 8/2015 | Alexander et al. |
| 2015/0244748 A1 | 8/2015 | Alexander et al. |
| 2015/0363478 A1* | 12/2015 | Haynes ................. G06Q 10/06 707/610 |
| 2016/0315941 A1 | 10/2016 | Dang et al. |
| 2017/0012984 A1 | 1/2017 | Dang et al. |
| 2017/0315683 A1 | 11/2017 | Boucher et al. |
| 2017/0315979 A1 | 11/2017 | Boucher et al. |
| 2019/0028286 A1 | 1/2019 | Alexander et al. |
| 2019/0138587 A1 | 5/2019 | Silk et al. |
| 2019/0213243 A1 | 7/2019 | Silk et al. |
| 2020/0053176 A1 | 2/2020 | Jimenez Salgado et al. |
| 2020/0142936 A1 | 5/2020 | Kaplan et al. |
| 2020/0193054 A1 | 6/2020 | Bond |
| 2020/0265040 A1 | 8/2020 | Jung et al. |
| 2021/0357861 A1 | 11/2021 | Haramati et al. |
| 2021/0357863 A1 | 11/2021 | Cohen et al. |
| 2021/0382734 A1 | 12/2021 | Rosenstein et al. |
| 2022/0036311 A1 | 2/2022 | Didrickson et al. |

\* cited by examiner

Before and After Example of Multi-Block Text Deletion

Before

Page Node

1. Grandparent of start block (1st child of page node)
   a. Parent of start block
      i. Preceding sibling of start block
      ii. Start block *selection starts here* → (selected trailing text
         1. removed child of start block
         2. removed child of start block
      iii. removed next sibling of start block
         1. removed next sibling child
   b. removed aunt of start block
   c. removed aunt of start block
2. Great grand parent of end block (2nd child of page node)
   a. Grandparent of end block
      i. Parent of end block
         1. Preceding sibling of end block
         2. Preceding sibling of end block
         3. End block selected proceeding text ) ← *selection ends here*
            1. child 1 of end block
            2. child 2 of end block
         4. Following sibling of end block
         5. Following sibling of end block
      ii. Aunt of end block
   b. Great aunt of end block
3. 3rd Child of page node

*Page node is the common ancestor of the start and end blocks* after

1. Grandparent of start block (1st child of page node)
   a. Parent of start block
      i. Preceding sibling of start block
      ii. Start Block *selection started here* → () ← *selection ended here*
         1. former child 1of end block, now child of start block
         2. former child 2 of end block, now child of start block
      iii. Former following sibling of end block, now child of start block's parent
      iv. Former following sibling of end block, now child of start block's parent
   b. Former aunt of end block, moved to child of start block's grandparent
2. Former great aunt of end block, moved to be new 2nd child of page node
3. 3rd Child of page node (no change)

SYSTEM, METHOD, AND COMPUTER PROGRAM FOR ENABLING TEXT EDITING ACROSS MULTIPLE CONTENT BLOCKS IN A SYSTEM

BACKGROUND OF THE INVENTION

1. Field of the Invention

This invention relates generally to computer workspaces in cloud-based software applications and, more specifically, to a system and method for enabling text editing across multiple content blocks in a system in which a workspace page comprises a plurality of hierarchical content blocks.

2. Description of the Background Art

The traditional computer workspace includes document editors, where a page is the fundamental unit. Information added to a page is stored in files and folders and locked within such a construct. While such a model has been accepted for decades, it is also functionally limiting and inefficient. While some progress has been made related to the use of containers of content, setting up such containers in a conventional system is not intuitive and requires time and many steps to accomplish. Therefore, there is a need to change the model such that information on a workspace page would be dynamic and able to stand on its own, for example, within a hierarchy of blocks. One challenge, however, in changing the model to a block data model is how to handle the text. In a conventional system, text on a page is within the page as the fundamental unit. As a result, editing and deleting text is straightforward.

Unlike the conventional system, however, text in a block data model can encompass a plurality of content blocks. This makes editing and deleting text in a block data model difficult. For example, when a user deletes multiple lines of text in a conventional workspace, the selected text is simply deleted. If the user were to delete multiple lines of text in a block data model that applies a conventional method for deletion, the workspace would be left with empty content blocks (i.e., content blocks with empty text value fields).

Furthermore, another challenge arises due to the structure of the block data model (i.e., a hierarchical tree), namely, if a parent block is within the text selection range for deletion, but one or more child blocks are outside the text selection range for deletion, the child block(s) must be moved to an appropriate location within the hierarchical tree during the deletion process. Therefore, there is a need for a system and method to enable a user to edit and delete text over a plurality of content blocks at the same time within the block data model.

SUMMARY OF THE DISCLOSURE

The present disclosure describes a system, method, and computer program for enabling text editing across multiple content blocks in a system in which a workspace page comprises a plurality of hierarchical content blocks. The method is performed by a computer system that includes servers, storage systems, networks, operating systems, and databases.

The present invention provides a completely different paradigm for computer workspaces. It is based on a hierarchical block data model, where each piece of information in a workspace page is stored as separate records in a database. This is different from how most text editors store information. Each content block has a list of attributes including: a unique identifier, a type, a list of properties, a format, a list of child blocks, and a pointer to its parent block. One type of content block is a text content block (also referred to as a text block). Unlike the conventional system in which a page is the fundamental unit and all text within the page exists as one unit within the page, in the block data model the text within the page can encompass a plurality of content blocks. The present invention provides a system and method for how to edit and delete text over a plurality of content blocks.

For example, in certain embodiments, in response to a user edit being an annotation (e.g., change to format, style, hyperlink, etc.), the system identifies the content blocks within a text selection range (i.e., from the start text index value of the start content block to the end text index value of the end content block, thus taking into account content blocks in which the text is only partially selected) that have text content and updates the text value field of each of said text blocks to associate the annotation with text in the block that is within the text selection range. In certain embodiments, in response to the user edit being a deletion, the system deletes the content block within the text selection range, identifies a child block of the deleted content block that is outside the text selection range, moves the child block to be a child of a content block that is before the text selection range in the hierarchical tree, and updates the user interface to reflect the move in the hierarchical tree.

In one embodiment, a method for enabling text editing across multiple content blocks in a system in which a workspace page comprises a plurality of hierarchical content blocks comprises the following steps:

rendering a workspace page comprising a plurality of content blocks in a user interface of a client application, wherein the workspace page is rendered according to a hierarchical tree derived from the parent and child attributes of the content blocks on the workspace page, wherein at least a subset of the plurality of content blocks has a text value field, and wherein rendering the workspace page comprises displaying the text value for the subset of content blocks;

maintaining an in-memory selection state for text selection in the client application;

receiving a user selection of text on the workspace page across a plurality of content blocks;

updating the in-memory selection state to include a text selection range, wherein the text selection range comprises a start content block and a start text index value and an end content block and an end text index value;

receiving a user edit to the selected text;

identifying the plurality of content blocks within the text selection range; and applying the user edit to the content blocks within the text selection range.

BRIEF DESCRIPTION OF THE DRAWINGS

FIG. 3 is a before and after example of a multi-block text deletion according to one embodiment.

DETAILED DESCRIPTION OF THE PREFERRED EMBODIMENTS

The present disclosure describes a system, method, and computer program for enabling text editing across multiple content blocks in a system in which a workspace page comprises a plurality of hierarchical content blocks. As defined herein, text includes rich text such as characters with styles, links, rich tokens, etc. The method is performed by a computer system that includes servers, storage systems, networks, operating systems, and databases ("the system").

1. Block Data Model

A block data model is comprised of one or more blocks, which are content containers. All blocks in the block data model are content blocks. The content of a block can take many forms. For example, text, images, lists, a row in a database, pages, or one or more child blocks. Some blocks may have one type of content, e.g., a block containing text or a block containing one or more child blocks. Some blocks may have more than one type of content, e.g., a block containing both text and one or more child blocks. Content on workspace pages (e.g., wiki pages) rendered by the system is stored in blocks and each of the workspace pages has a hierarchy of blocks (with each workspace page as the block at the top of the hierarchy).

Every content block on a workspace page has attributes that describe the content block itself and attributes that define the content block's relationships with other blocks. For example, attributes that describe the content block itself include: a unique identifier, a list of properties (e.g., a "title" property which stores the text content of blocks), and a type attribute that determines how a content block is displayed. The attributes that define the content block's relationships with other blocks include: an array (or ordered set) of child blocks and a pointer to its parent block. Examples of content block types include text, image, page, heading, callout, list (e.g., a to-do list, a numbered list, a bulleted list, etc.), toggle, a row in a database, synced blocks (described in U.S. patent application Ser. No. 17/549,565, which is incorporated by reference as if fully disclosed herein), etc. Each content block is stored as a row in a database.

A user can combine content blocks, move content blocks between locations, and change a content block's type attribute from one block type to another block type. When a user changes a content block's type attribute, the block's properties and content do not change, but the type attribute changes, which, in turn, affects whether and how the properties are rendered. For example, when a content block has the type "to-do list," the "checked" property of the content block is rendered, but when the content block is changed to a "heading" type or a "callout" type, the "checked" property of the content block is not rendered.

The content block's relationships with other blocks also define how the content block is rendered. For example, the hierarchical relationships between a content block, its array of child blocks, its parent block, and any sibling blocks form a "render tree" that renders each of the content blocks in a hierarchical tree based on each content block's type attribute. For example, for "list" blocks such as a "bulleted list" block and a "to-do list" block, the text content of the child block(s) is indented below the text content of the block itself. For a "toggle list" block, the text content of the child block(s) is also indented below the text content of the block itself, but the child block(s) is only rendered when the toggle property is expanded; otherwise, only the text content of the block itself is rendered. For a "page" block, the content of the block is displayed in a new page rather than indented on the current page.

Editing the hierarchical tree is also based on the relationships between the content blocks. For example, unlike a conventional workspace, indenting a content block does not just change the style properties of the content blocks, but it also changes the hierarchical structure of the tree such that the indented content block is added as a child block to the nearest preceding sibling block.

The hierarchical relationships between the content blocks also determine which users have permission to view or edit which content blocks. A content block inherits the permissions of its parent block. Hence, the attribute of a content block that is a pointer to its parent block determines the permissions of the content block. In other words, as the permissions are traced through the hierarchy, the workspace page block as the block at the top of the hierarchy ultimately determines the permissions for the entire workspace page.

Example implementations of the methods are described in more detail with respect to FIGS. 1-4.

2. Method for Enabling Text Editing Across Multiple Content Blocks

Figure 1:
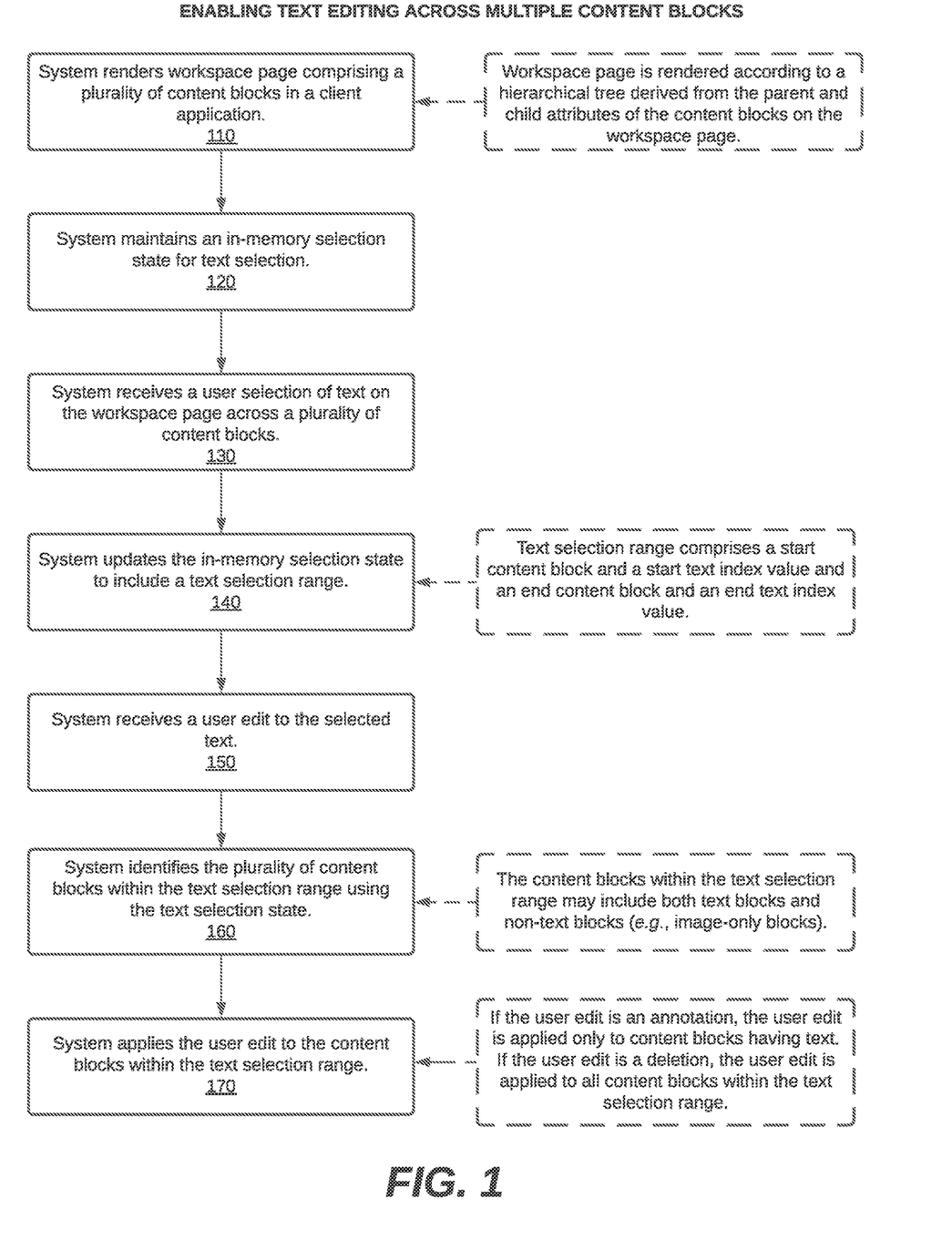
FIG. 1 is a flowchart that illustrates a method, according to one embodiment, for enabling text editing across multiple content blocks.

FIG. 1 illustrates a method for enabling text editing across multiple content blocks. The system renders a workspace page including a plurality of content blocks in a user interface of a client application (step 110). The workspace page is rendered according to a hierarchical tree derived from the parent and child attributes of the content blocks on the workspace page. Rendering content blocks is a recursive process, starting with the content block at the top of the hierarchical tree. Sibling nodes are rendered from left to right.

For each text block, the client application first renders the text value (i.e., the title, caption, or comment property) of the content block. The client application then renders the child block(s), if any. The hierarchical tree is graphically illustrated using indentations from the left margin. Unlike conventional workspaces, indenting a content block is not adding a style property to a content block. It changes where it sits in the hierarchical tree. In other words, indenting a content block changes the content block's relationships to other content blocks. When rendering content blocks, the system creates an in-memory version of the block data that resides within the client application memory. Specifically, when a client application executes the code for a workspace page, it creates an in-memory software object or "record cache." For each block in the workspace page, the record cache includes an in-memory copy of that block data and a pointer to the block data in the persistent database. The contents of the record cache are transitory; when a user closes the workspace page, the record cache data created for the page is deleted. The in-memory object also includes read and write functions that enable content to be read from and written to the database.

At least a subset of the plurality of content blocks has a text value field. Rendering the workspace page includes displaying the text value for the subset of content blocks. The system maintains an in-memory selection state for text selection in the client application (step 120). In certain embodiments, the text selection state is set to one of a number of modes. For example, when a page first renders and the user has not yet clicked within a content block, the text selection state is set to the "empty" mode. When the user clicks within a content block, but is on a read-only page, the state is set to a "read-only" mode. When the user clicks within a content block and the user can edit the page, the state is set to an "edit" mode. The selection state also includes which property of the content block that is being selected, for example, the title, caption, or comment.

The system receives a user selection of text on the workspace page across a plurality of content blocks (step 130). The system updates the in-memory selection state to include a text selection range (step 140). More specifically, the block ID of the start content block, along with the start text index value in the text value field, and the block ID of the end content block, along with the end text index value in the text value field, are stored in the selection state as the text selection range. In certain embodiments where a content block has more than one type of text value field (e.g., a title field, a caption field, a comment field, etc.), then the text selection state also specifies which of the text fields has the selected text. The system receives a user edit to the selected text (step 150). The system identifies the plurality of content blocks within the text selection range using the text selection state (step 160). The content blocks within the text selection range may include both text blocks (e.g., text block, heading block, list block, etc.) and non-text blocks (e.g., image-only block, synced block, etc.). The system applies the user edit to the content blocks within the text selection range (step 170).

In certain embodiments, if the user edit is an annotation, the user edit is applied only to content blocks having text. The system ignores the non-text blocks. This is done by identifying the content blocks within the text selection range that have text content (i.e., text blocks) and updating the text value field of each of said text blocks to associate the annotation with text in the block that is within the text selection range. In certain embodiments, there may be some text that is outside the text selection range. For example, with respect to the text in the start content block, the annotation is associated with the text after and at the start text index value in the text value field. With respect to the end content block in the text selection range, the annotation is associated with text before the end text index value in the text value field. Examples of annotations include changing the font, changing the font size, bolding the text, italicizing the text, etc. One or more annotations are stored in association with the text in each content block.

If the user edit is a deletion, the user edit is applied to all content blocks (i.e., text blocks and non-text blocks) within the text selection range. This is done by deleting content blocks within the text selection range (except for the start block). The system identifies all child blocks of the deleted content blocks that are outside the text selection range. The system moves these child blocks to be a child of a content block that is before the text selection range in the hierarchical tree. The system updates the user interface to reflect the move in the hierarchical tree. For example, the system changes how the moved child block is indented on the workspace page to reflect its new position in the hierarchical tree. If the child blocks are a part of an outline, then the numbering of the block would change (see, e.g., FIG. 3).

In certain embodiments, moving each child block includes identifying a common ancestor of the start and end content blocks in the hierarchical tree. The system identifies a start path from the common ancestor to the start content block, and an end path from the common ancestor to the end content block. The system determines a number of hierarchical levels that the child block's deleted parent block is up from the end content block in the hierarchical tree. The system identifies a content block in the start path that is said number of hierarchical levels up the hierarchical tree from the start content block. The system inserts the child block as a child of said identified content block.

In certain embodiments, the client application stores block data in memory. The user edit to the content blocks is first stored in memory and then later saved to a database, where each of the content blocks is a separate data object in the database.

3. Method for Text Deletion Across Multiple Content Blocks

Figure 2A:
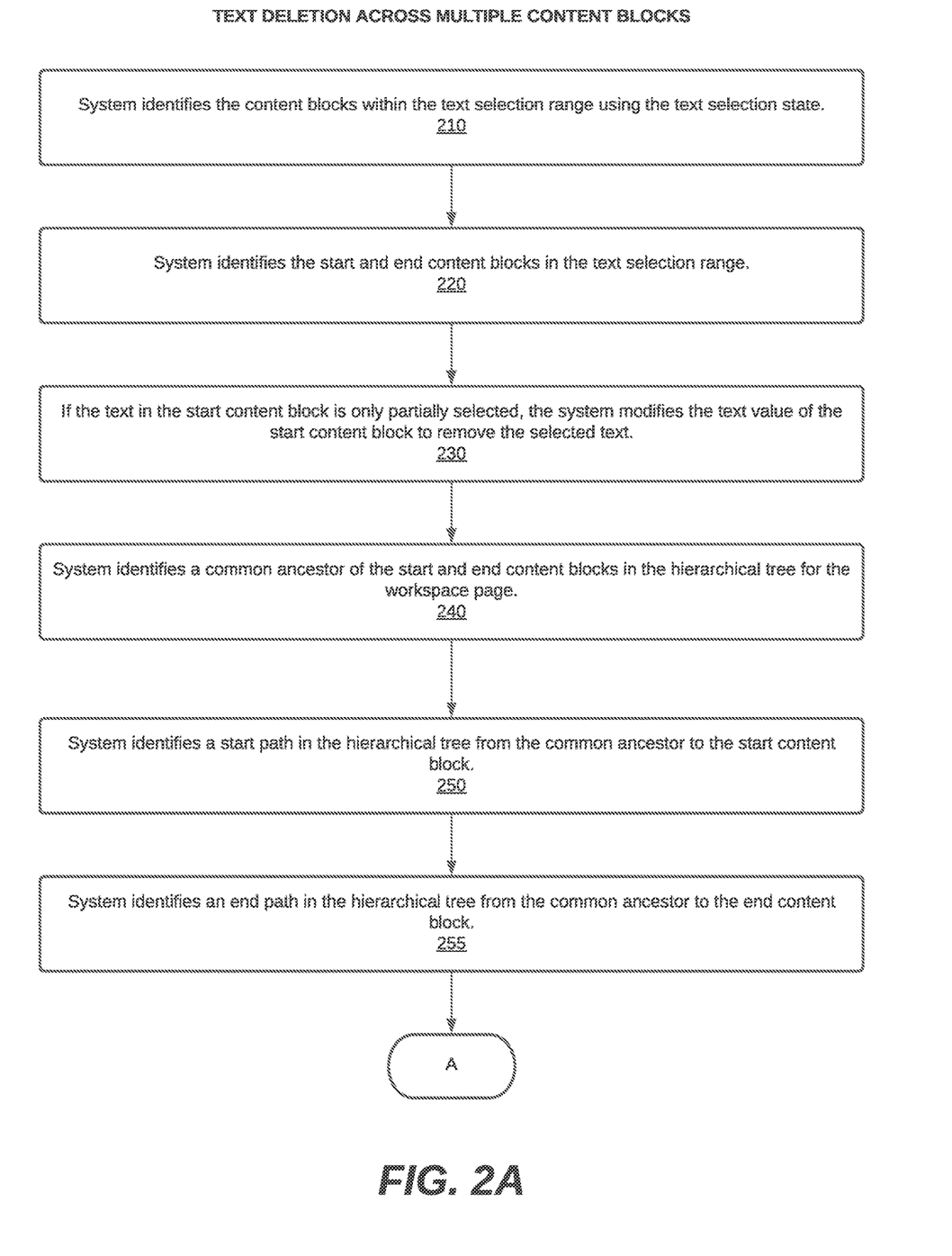
FIGS. 2A-2C are flowcharts that illustrate a method, according to one embodiment, for text deletion across multiple content blocks.
Figure 2B:
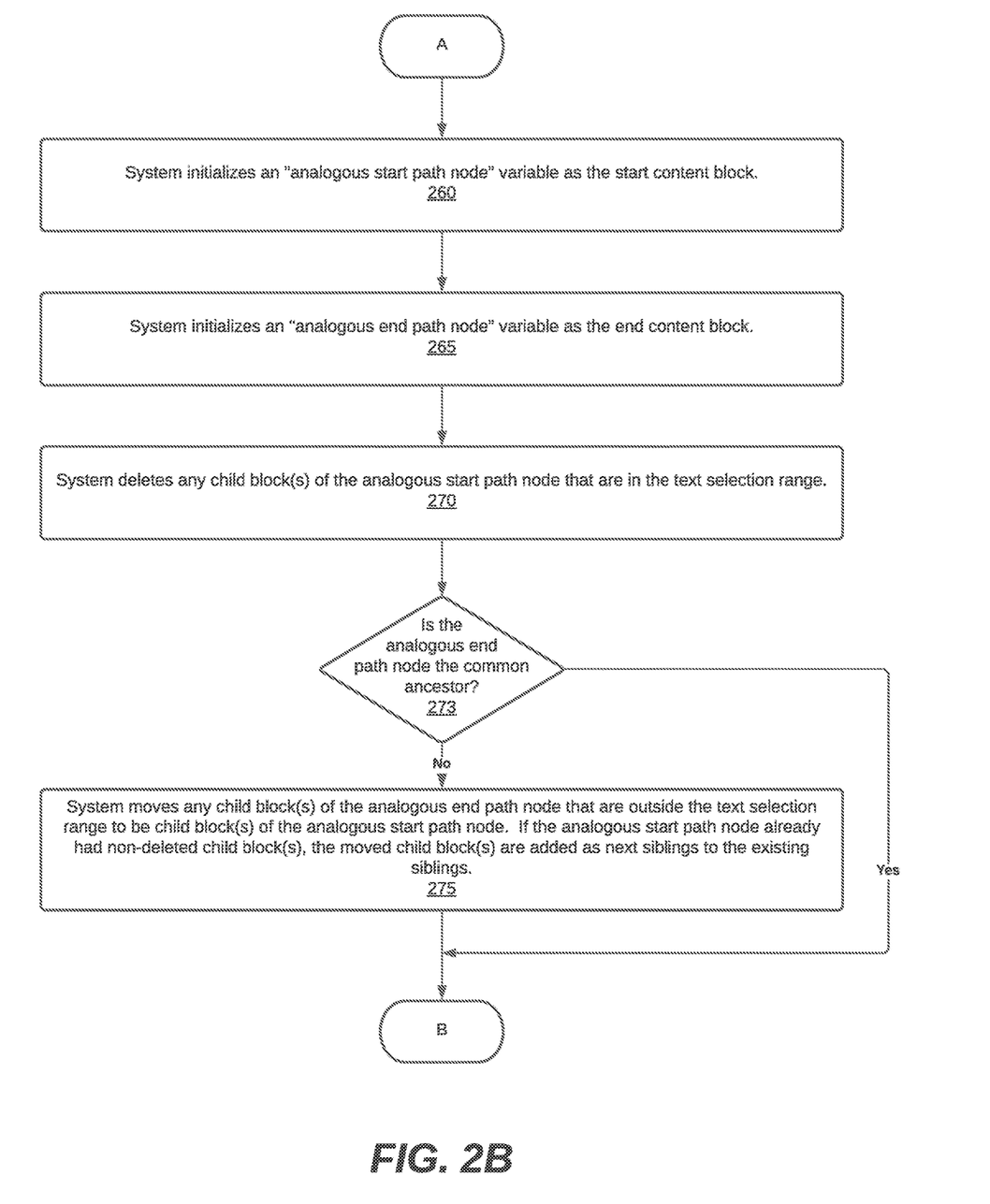
Figure 2C:
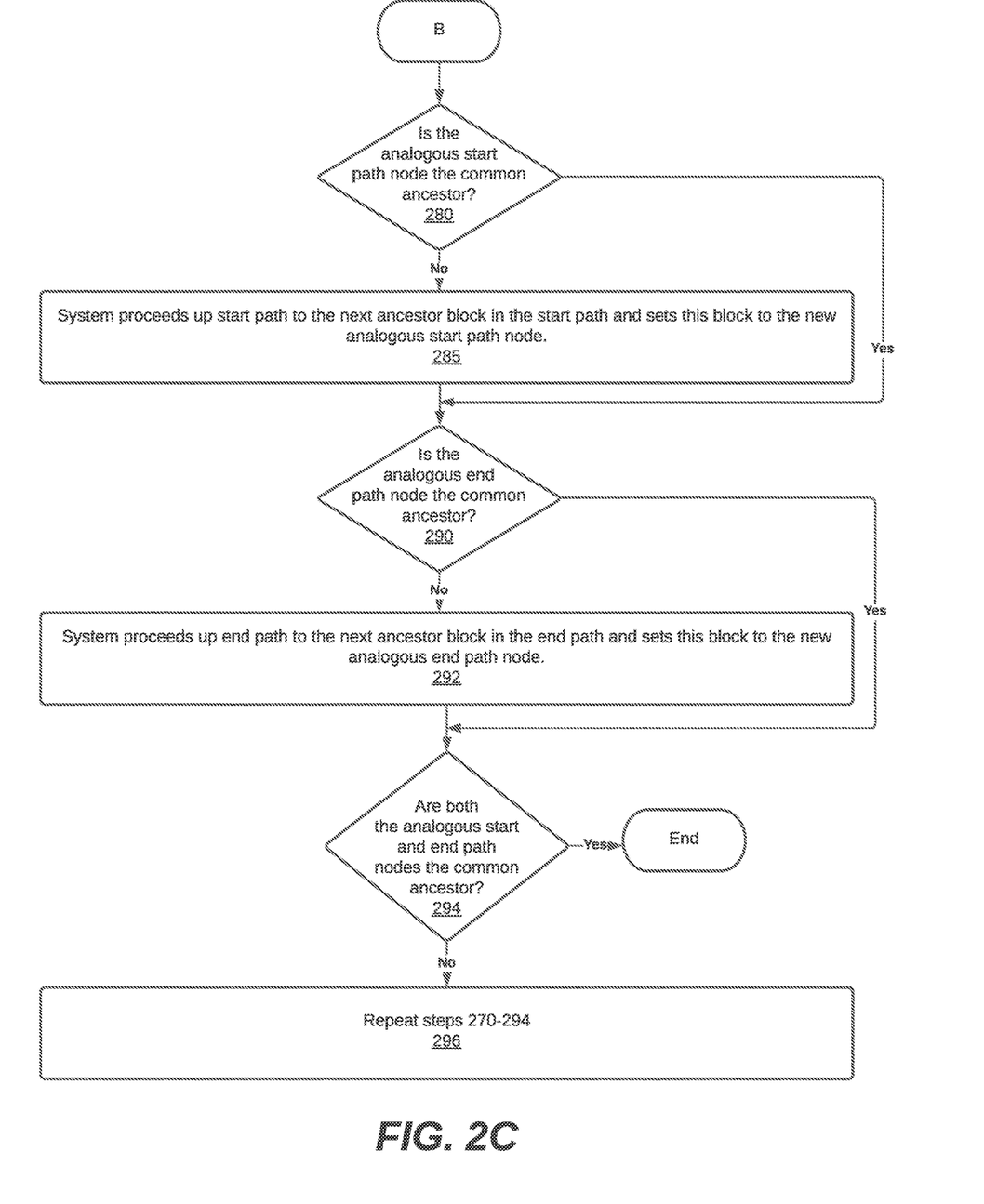

FIGS. 2A-2C illustrate a method for text deletion across multiple content blocks. The system identifies the content blocks within the text selection range using the text selection state (step 210). The system identifies the start and end content blocks in the text selection range (step 220). If the text in the start content block is only partially selected, the system modifies the text value of the start content block to remove the selected text (step 230). The system identifies a common ancestor of the start and end content blocks in the hierarchical tree for the workspace page (step 240). The system identifies a start path in the hierarchical tree from the common ancestor to the start content block (step 250). The system identifies an end path in the hierarchical tree from the common ancestor to the end content block (step 255).

The system initializes an "analogous start path node" variable as the start content block (step 260). The system initializes an "analogous end path node" variable as the end content block (step 265). The system deletes any child block(s) of the analogous start path node that are in the text selection range (step 270). The system determines whether the analogous end path node is the common ancestor (step 273). If not, the system moves any child block(s) of the analogous end path node that are outside the text selection range to be child block(s) of the analogous start path node (step 275). If the analogous start path node already had non-deleted child block(s), the moved child block(s) are added as next siblings to the existing siblings.

If the system determines that the analogous end path node is the common ancestor (step 273), the system then determines whether the analogous start path node is the common ancestor (step 280). If not, the system proceeds up the start path to the next ancestor block in the start path and sets this block to the new analogous start path node (step 285). If the system determines that the analogous start path node is the common ancestor, the system then determines whether the analogous end path node is the common ancestor (step 290). If not, the system proceeds up the end path to the next ancestor block in the end path and sets this block to the new analogous end path node (step 292). If the system determines that the analogous end path node is the common ancestor, the system then determines whether both analogous start and end path nodes are the common ancestor (step 294). If not, then the system repeats steps 270-294 (step 296). If the system determines that both the analogous start and end paths nodes are the common ancestor, then the process ends.

FIG. 3 illustrates a before and after example of multi-block text deletion using the method of FIGS. 2A-2C.

4. Example System Architecture

Figure 4:
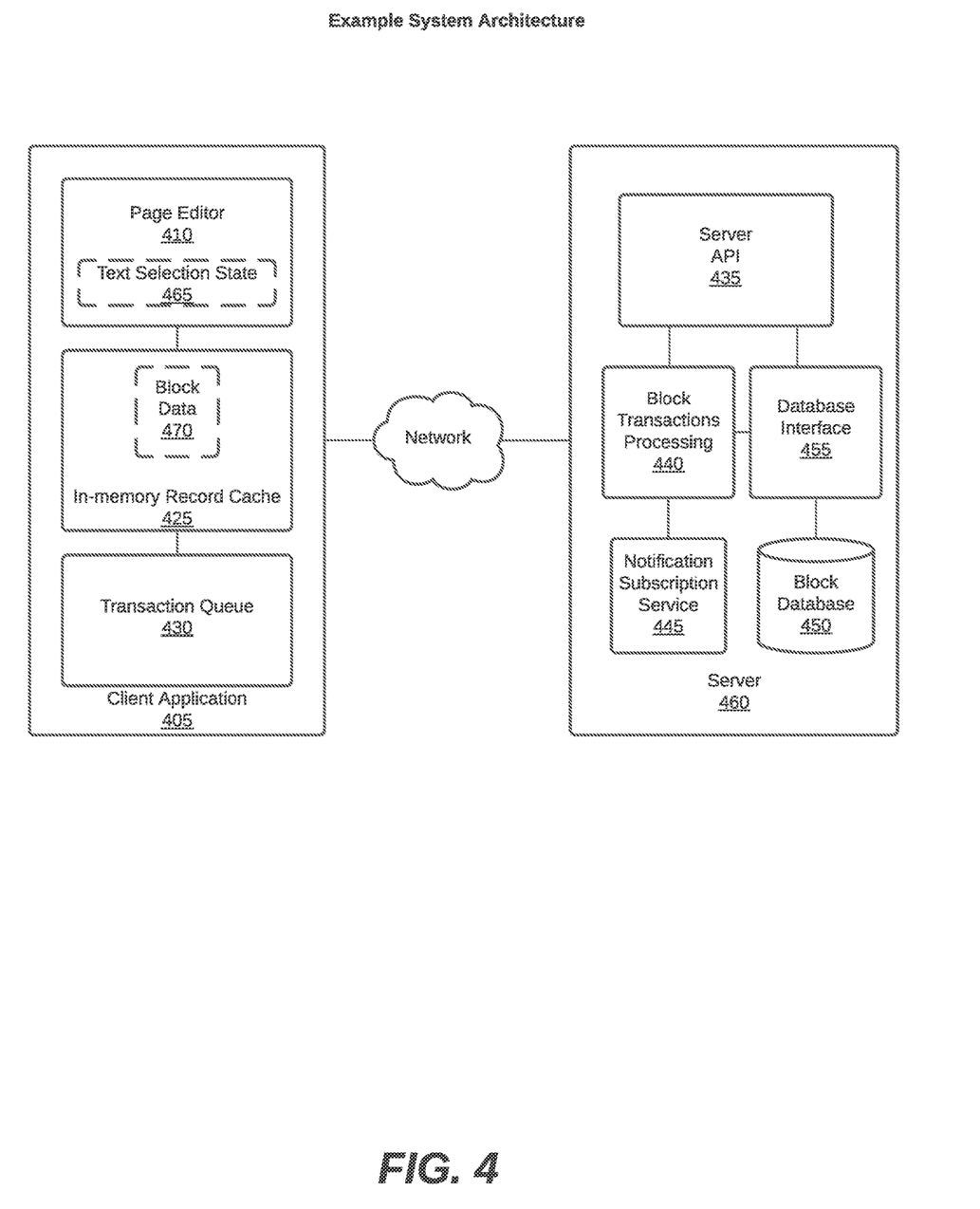
FIG. 4 is a block diagram that illustrates an example system architecture according to one embodiment.

FIG. 4 illustrates an example architecture for a system that performs the methods described herein. However, the methods described herein may be implemented in other systems and are not limited to the illustrated system.

In FIG. 4, a client application 405 is connected to a server 460 via a network. The client application 405 includes a page editor 410, an in-memory record cache 425, and a transaction queue 430. The page editor 410 enables the creation, selecting, editing, and deleting of content blocks and maintains the text selection state 465 in memory. The in-memory record cache 425 temporarily stores block data 470 for content blocks rendered by the client application 405, including changes made in the client application 405. The transaction queue 430 groups changes to content blocks (e.g., creations, edits, and deletions) into transactions, and sends the transactions to the server 460.

The server includes a server application programming interface (API) 435, a block transactions processing module 440, a notification subscription service module 445, a block database 450, and a database interface 455. The server API 435 sends block data to and receives block data from the client application 405. When a client application 405 requests a workspace page, the server API 435 receives the request, the database interface 455 retrieves block data for the requested page from the block database 450, and the block data is sent to the client application 405 via the server API 435. Transactions from the client application 405 are received at the server API 435 and sent to the block transaction processing module 440. The block transaction processing module 440 processes transactions from client application 405 and saves valid block changes to the block database 450 via the database interface 455. The notification subscription service module 445 notifies client application 405 of changes to content blocks to which they subscribe. Client application 405 subscribes to notifications for content blocks currently rendered in the client application 405.

5. General

The methods described with respect to FIGS. 1-4 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for enabling text editing across multiple content blocks in a system in which a workspace page comprises a plurality of hierarchical content blocks, the method comprising:
    rendering a workspace page comprising a plurality of content blocks in a user interface of a client application, wherein each content block has (1) attributes that describe the content block itself including a unique identifier, a list of properties, and a type attribute that determines how the content block is displayed and (2) attributes that define the content block's relationships with other content blocks including an array of child blocks and a pointer to its parent block, wherein the workspace page is rendered according to a hierarchical tree derived from the parent and child attributes of the content blocks on the workspace page, wherein at least a subset of the plurality of content blocks has a text value field, and wherein rendering the workspace page comprises displaying the text value for the subset of content blocks;
    maintaining an in-memory selection state for text selection in the client application;
    receiving a user selection of text on the workspace page across a plurality of content blocks;
    updating the in-memory selection state to include a text selection range, wherein the text selection range comprises a start content block and a start text index value and an end content block and an end text index value;
    receiving a user edit to the selected text;
    identifying the plurality of content blocks within the text selection range; and
    applying the user edit to the content blocks within the text selection range.

2. The method of claim 1, wherein the client application stores block data in memory, and wherein the user edit to the content blocks is first stored in memory and then later saved to a database, wherein each of the content blocks is a separate data object in the database.

3. The method of claim 1, wherein in response to the user edit being an annotation, the method further comprises:
    identifying the content blocks within the text selection range that have text content ("text blocks"); and
    updating the text value field of each of said text blocks to associate the annotation with text in the block that is within the text selection range.

4. The method of claim 3, wherein, with respect to the text in the start content block, the annotation is associated with the text after and at the start text index value in the text value field.

5. The method of claim 4, wherein, with respect to the end content block in the text selection range, the annotation is associated with text before the end text index value in the text value field.

6. The method of claim 1, wherein in response to the user edit being a deletion, the method further comprises:
    deleting a content block within the text selection range;
    identifying a child block of the deleted content block that is outside the text selection range;
    moving the child block to be a child of a content block that is before the text selection range in the hierarchical tree; and
    updating the user interface to reflect the move in the hierarchical tree.

7. The method of claim 6, wherein moving the child block comprises:
    identifying a common ancestor of the start and end content blocks in the hierarchical tree;
    identifying a start path from the common ancestor to the start content block;
    identifying an end path from the common ancestor to the end content block;
    determining a number of hierarchical levels that the child block's deleted parent block is up from the end content block in the hierarchical tree;
    identifying a content block in the start path that is said number of hierarchical levels up the hierarchical tree from the start content block; and
    inserting the child block as a child of said identified content block.

8. A non-transitory computer-readable medium comprising a computer program, that, when executed by a computer system, enables the computer system to perform the following steps for enabling text editing across multiple content blocks in a system in which a workspace page comprises a plurality of hierarchical content blocks, the steps comprising:

rendering a workspace page comprising a plurality of content blocks in a user interface of a client application, wherein each content block has (1) attributes that describe the content block itself including a unique identifier, a list of properties, and a type attribute that determines how the content block is displayed and (2) attributes that define the content block's relationships with other content blocks including an array of child blocks and a pointer to its parent block, wherein the workspace page is rendered according to a hierarchical tree derived from the parent and child attributes of the content blocks on the workspace page, wherein at least a subset of the plurality of content blocks has a text value field, and wherein rendering the workspace page comprises displaying the text value for the subset of content blocks;

maintaining an in-memory selection state for text selection in the client application;

receiving a user selection of text on the workspace page across a plurality of content blocks;

updating the in-memory selection state to include a text selection range, wherein the text selection range comprises a start content block and a start text index value and an end content block and an end text index value;

receiving a user edit to the selected text;

identifying the plurality of content blocks within the text selection range; and applying the user edit to the content blocks within the text selection range.

9. The non-transitory computer-readable medium of claim 8, wherein the client application stores block data in memory, and wherein the user edit to the content blocks is first stored in memory and then later saved to a database, wherein each of the content blocks is a separate data object in the database.

10. The non-transitory computer-readable medium of claim 8, wherein in response to the user edit being an annotation, the method further comprises:

identifying the content blocks within the text selection range that have text content ("text blocks"); and updating the text value field of each of said text blocks to associate the annotation with text in the block that is within the text selection range.

11. The non-transitory computer-readable medium of claim 10, wherein, with respect to the text in the start content block, the annotation is associated with the text after and at the start text index value in the text value field.

12. The non-transitory computer-readable medium of claim 11, wherein, with respect to the end content block in the text selection range, the annotation is associated with text before the end text index value in the text value field.

13. The non-transitory computer-readable medium of claim 8, wherein in response to the user edit being a deletion, the method further comprises:

deleting a content block within the text selection range;

identifying a child block of the deleted content block that is outside the text selection range;

moving the child block to be a child of a content block that is before the text selection range in the hierarchical tree; and updating the user interface to reflect the move in the hierarchical tree.

14. The non-transitory computer-readable medium of claim 13, wherein moving the child block comprises:

identifying a common ancestor of the start and end content blocks in the hierarchical tree;

identifying a start path from the common ancestor to the start content block;

identifying an end path from the common ancestor to the end content block;

determining a number of hierarchical levels that the child block's deleted parent block is up from the end content block in the hierarchical tree;

identifying a content block in the start path that is said number of hierarchical levels up the hierarchical tree from the start content block; and inserting the child block as a child of said identified content block.

15. A computer system for enabling text editing across multiple content blocks in a system in which a workspace page comprises a plurality of hierarchical content blocks, the system comprising:

one or more processors;

one or more memory units coupled to the one or more processors, wherein the one or more memory units store instructions that, when executed by the one or more processors, cause the system to perform the operations of:

rendering a workspace page comprising a plurality of content blocks in a user interface of a client application, wherein each content block has (1) attributes that describe the content block itself including a unique identifier, a list of properties, and a type attribute that determines how the content block is displayed and (2) attributes that define the content block's relationships with other content blocks including an array of child blocks and a pointer to its parent block, wherein the workspace page is rendered according to a hierarchical tree derived from the parent and child attributes of the content blocks on the workspace page, wherein at least a subset of the plurality of content blocks has a text value field, and wherein rendering the workspace page comprises displaying the text value for the subset of content blocks;

maintaining an in-memory selection state for text selection in the client application;

receiving a user selection of text on the workspace page across a plurality of content blocks;

updating the in-memory selection state to include a text selection range, wherein the text selection range comprises a start content block and a start text index value and an end content block and an end text index value;

receiving a user edit to the selected text;

identifying the plurality of content blocks within the text selection range; and applying the user edit to the content blocks within the text selection range.

16. The computer system of claim 15, wherein the client application stores block data in memory, and wherein the user edit to the content blocks is first stored in memory and then later saved to a database, wherein each of the content blocks is a separate data object in the database.

17. The computer system of claim 15, wherein in response to the user edit being an annotation, the method further comprises:

identifying the content blocks within the text selection range that have text content ("text blocks"); and updating the text value field of each of said text blocks to associate the annotation with text in the block that is within the text selection range.

18. The computer system of claim 17, wherein, with respect to the text in the start content block, the annotation is associated with the text after and at the start text index value in the text value field.

19. The computer system of claim 18, wherein, with respect to the end content block in the text selection range, the annotation is associated with text before the end text index value in the text value field.

20. The computer system of claim 15, wherein in response to the user edit being a deletion, the method further comprises:
   deleting a content block within the text selection range;
   identifying a child block of the deleted content block that is outside the text selection range;
   moving the child block to be a child of a content block that is before the text selection range in the hierarchical tree; and
   updating the user interface to reflect the move in the hierarchical tree.

21. The computer system of claim 20, wherein moving the child block comprises:
   identifying a common ancestor of the start and end content blocks in the hierarchical tree;
   identifying a start path from the common ancestor to the start content block;
   identifying an end path from the common ancestor to the end content block;
   determining a number of hierarchical levels that the child block's deleted parent block is up from the end content block in the hierarchical tree;
   identifying a content block in the start path that is said number of hierarchical levels up the hierarchical tree from the start content block; and
   inserting the child block as a child of said identified content block.

* * * * *